Patented Dec. 30, 1952

2,623,840

UNITED STATES PATENT OFFICE 2,623,840

SPERMICIDAL COMPOSITIONS

Abraham Taub, New York, N. Y., assignor to Julius Schmid, Inc., New York, N. Y., a corporation of New York No Drawing. Application November 21, 1950, Serial No. 196,961

12 Claims. (Cl. 167—58)

The present invention relates to an improved spermicidal composition. This application is a continuation-in-part of my application Serial No. 609,323, filed August 6, 1945, now abandoned, for Spermicidal Composition.

It is well known that heretofore various spermicidal compositions have been used. Of the various types heretofore used, the diaphragm and jelly method appear to have been the most acceptable and the most desirable. Certain disadvantages have been encountered, however, the most serious of which was the long time required to destroy the sperm, the lack of efficacy due to shortcomings of the jelly, the irritation of the delicate vaginal mucosa, and other undesirable features. Many attempts have been made to overcome these disadvantages, but none, so far as I am aware, has been wholly successful and satisfactory in actual practice.

I have now discovered a solution of the problem confronting the art by which the disadvantages heretofore encountered are overcome by the use of an improved spermicidal composition involving a unique combination of substances which constitutes a radical departure from the teachings of the prior art. As those skilled in the art are aware, the prior art taught that a spermicidal composition could be made by adding to a semisolid base an agent selected from the group consisting of acids, alkalies, oxidizing agents, or other classes of chemical derivatives having germicidal, coagulating, or membrane-penetrating properties. It is now known that the very properties of these prior art compositions which tended to destroy the sperm inherently tended also to detrimentally affect and irritate the delicate vaginal mucosa.

It has heretofore been generally considered that a spermicidal composition having a pH higher than 7.0 produces a tendency to irritate body tissues and creates an environment which makes undesirable infections possible. I have discovered, however, that an improved spermicidal composition containing fatty acid monoesters of a poly-oxyethylene glycol and having a pH higher than 7.0, preferably from 7.1 to 10.0, may be advantageously used without causing irritation of delicate body membranes.

It is an object of the present invention to provide a novel spermicidal composition containing a monoester in the alkaline range which is adapted to effectively destroy the sperm within relatively short periods of time without irritating the delicate vaginal mucosa or having other detrimental effects.

Another object of the invention is to provide a novel spermicidal composition which has an alkaline reaction and which has adequate consistency for mechanical barrier action, together with effective adhesiveness, good spreading power and miscibility with the vaginal and sperm secretions within the alkaline range.

A further object of the invention is to provide a novel alkaline spermicidal composition which is easily applied and which is esthetically acceptable to the user with respect to color, odor and general appearance.

The present invention also contemplates the provision of a novel spermicidal composition having a pH within the alkaline range, while at the same time having increased stability and compatibility among the several components of the composition.

Moreover, it is another object of the invention to provide a novel spermicidal composition which is non-toxic, non-irritant and non-staining, and which does not melt or flow out at body temperatures and is water-washable.

Other objects of the invention and advantages thereof will become apparent from the following description:

Broadly stated, the present invention contemplates an improved spermicidal composition involving a novel combination of chemical substances which is effective within the alkaline range. The novel combination includes a spermicidal agent, a thickening agent, an alkalinizing agent or a buffer, and a plasticizing agent. The spermicidal agent which I have discovered is uniquely adapted to my novel spermicidal composition in an alkaline medium is a fatty acid mono-ester of a polyoxyethylene glycol and is defined by the generic chemical formula:

$$CH_2OR_a(CH_2OCH_2)_xCH_2OR_b$$

in which "$x$" is 2 or more, "$R_a$" is hydrogen and "$R_b$" is an acyl radical of a fatty acid having six or more carbon atoms. As a general rule, I use water to make up the balance of the composition and add an alkalinizing agent or a buffer to adjust the pH of the composition within the alkaline range, preferably from about 7.1 to about 10.0, which has been found to be particularly effective, although a pH up to 11.0 or higher may be used.

I prefer also to incorporate a transparentizing agent in my novel composition to make the product transparent and appealing to the user. The transparentizing agent operates, it is believed, by eliminating air inclusions from the product which would otherwise render it opaque.

For the purpose of giving those skilled in the art a better understanding of the invention, the following illustrative examples are given:

Example No. I

| Agent | Chemical composition | Percentage |
|---|---|---|
| Spermicidal agent | Dodecaethylene (dodecaoxyethylene) glycol monolaurate. | 5.0 |
| Plasticizing agent | Glycerin | 10.0 |
| Thickening agent | Tragacanth | 2.5 |
| Preservative agent | Butyl p-hydroxybenzoate | .02 |
| Sodium acetate buffer | Sodium acetate 2.93; sodium hydroxide 0.07. | 3.0 |
| Transparentizing agent | Ethyl alcohol | 4.0 |
| Vehicle | Water | Balance |

The pH of the above composition is in the alkaline range and is about 7.2.

Example No. II

| Agent | Chemical composition | Percentage |
|---|---|---|
| Spermicidal agent | Hexaoxyethylene glycol monooleate. | 10.0 |
| Plasticizing agent | Polyethylene glycol 400 | 5.0 |
| Thickening agent | Tragacanth (2.3%); Irish moss (1.0%). | 3.3 |
| Preservative | Propyl p-hydroxybenzoate | 0.2 |
| Transparentizing agent | Alcohol | 5.0 |
| Alkalinizing agent | Borax | 2.0 |
| Vehicle | Water | Balance |

The above composition has a pH in the alkaline range of about 9.0.

Example No. III

| Agent | Chemical composition | Percentage |
|---|---|---|
| Spermicidal Agent | Nonaoxyethylene glycol monostearate. | 8.0 |
| Plasticizing agent | Glycerin | 6.0 |
| Thickening agent | Tragacanth (2.5%); acacia (0.5%). | 3.0 |
| Preservative | Methyl p-hydroxybenzoate | .15 |
| Transparentizing agent | Alcohol | 5.0 |
| Buffer | Sodium acetate (2.0%); sodium hydroxide (0.25%). | 2.25 |
| Vehicle | Water | Balance |

Example No. IV

| Agent | Chemical composition | Percentage |
|---|---|---|
| Spermicidal agent | Dodecaoxyethylene glycol monolaurate. | 5.0 |
| Plasticizing agent | Glycerite of boroglycerin (2.0%); glycerin (7.0%). | 9.0 |
| Thickening agent | Tragacanth | 2.5 |
| Preservative | Butyl p-hydroxybenzoate | .02 |
| Transparentizing agent | Alcohol | 4.0 |
| Alkalinizing agent | Triethanolamine | 3.0 |
| Vehicle | Water | Balance |

This composition has a pH in the alkaline range of about 8.0.

Example No. V

| Agent | Chemical composition | Percentage |
|---|---|---|
| Spermicidal agent | Polyoxyethylene glycol monoester of the class consisting of caproic, heptylic, caprylic, monylic, capric, lauric, myristic, palmitic, margaric, and stearic acids and the corresponding unsaturated acids. | 3.0 |
| Plasticizing agent | Glycerin | 9.0 |
| Thickening agent | Sodium carboxymethyl cellulose. | 2.5 |
| Preservative | Butyl p-hydroxybenzoate | 1.0 |
| Transparentizing agent | Alcohol | 8.0 |
| Buffer | Sodium hydroxide (0.25%); boric acid (1.0%). | 1.25 |
| Vehicle | Water | Balance |

The above composition is alkaline and has a pH of about 10.5.

In these examples, the combination of plasticizing agent and thickener provides desirable adhesive action in the composition. The entire group of spermicidal agents have desirable spreading power in the composition and all operate satisfactorily in the alkaline range. While the spermicidal composition may have a desirable pH, I may use suitable buffer salts to adjust the pH to any desired quantity, preferably from 7.1 to 9.5, although a pH up to 11.0 may be advantageously used. I may, for example, use borate-boric acid buffers, such as sodium borate and boric acid, or acetate-acetic acid buffers, such as sodium acetate and acetic acid, or borax alone, which in a concentration of 2.0% give a pH of about 9, or triethanolamine which in a concentration of 2.0% gives a pH of about 8.0, or potassium hydroxide or sodium hydroxide, which when used in the amount of about 0.25% render the composition alkaline with a pH of about 10.5. It will be understood also that other compounds or combinations serving to control the pH value between 7.0 and 11.0 may be used as desired.

The following additional examples may be given as illustrative of other spermicidal compositions which may be used:

Example No. VI

| Agent | Chemical composition | Percentage |
|---|---|---|
| Spermicidal agent | Dodecaoxyethylene glycol monoester of an acid of the class including caproic, heptylic, caprylic, nonylic, capric, lauric, myristic, palmitic, margaric and stearic acids and the corresponding unsaturated acids. | 10.0 |
| Plasticizing agent | Sorbitol | 5.0 |
| Thickening agent | Karaya gum (2.3%); methyl cellulose (1.0%). | 3.3 |
| Preservative | Propyl p-hydroxybenzoate | .2 |
| Transparentizing agent | Ethyl alcohol | 5.0 |
| Alkalinizing agent | Potassium hydroxide | .25 |
| Vehicle | Water | Balance |

Example No. VII

| Agent | Chemical composition | Percentage |
|---|---|---|
| Spermicidal agent | Nonaoxyethylene glycol monoester of the class consisting of caproic, heptylic, caprylic, nonylic, capric, lauric, myristic, palmitic, margaric, and stearic acids and the unsaturated acids corresponding thereto. | 2.0 |
| Plasticizing agent | Glycerin | 6.0 |
| Thickening agent | Methyl cellulose (2.5%); acacia (0.5%). | 3.0 |
| Preservative | Methyl p-hydroxybenzoate | .15 |
| Transparentizing agent | Ethyl alcohol | 5.0 |
| Buffer | Sodium acetate (2.93%); sodium hydroxide (0.07%). | 3.0 |
| Vehicle | Water | Balance |

The above composition has a pH of about 7.2 in the above ratios.

Example No. VIII

| Agent | Chemical composition | Percentage |
|---|---|---|
| Spermicidal agent | Monoester of polyoxyethylene glycol of the formula $CH_2OR_a$ $(CH_2OCH_2)_xCH_2OR_b$, in which "$x$" is an integer of at least 2, "$R_a$" is hydrogen and "$R_b$" is the acyl radical of a saturated or unsaturated acid having at least six carbon atoms. | 10.0 |
| Thickening agent | Tragacanth (2.5%); methyl cellulose (0.5%). | 3.0 |
| Plasticizing agent | Polyethylene glycol (600) | 7.0 |
| Buffer | Borax (2.0%); boric acid (0.5%). | 2.5 |
| Vehicle | Water | Balance |

The above composition has a pH of about 9.0.

Example No. IX

| Agent | Chemical composition | Percentage |
|---|---|---|
| Spermicidal agent | Dodecaoxyethylene glycol monoacylate of a saturated acid of the group consisting of caproic, heptylic, caprylic, nonylic, capric, lauric, myristic, palmitic, margaric, and stearic acids or mixtures thereof. | 8.0 |
| Plasticizing agent | Glycerin (3.0%); and sorbitol (3.0%). | 6.0 |
| Thickening agent | Tragacanth (2.5%) and methyl cellulose (0.5%). | 3.0 |
| Preservative | Butyl p-hydroxybenzoate | .02 |
| Buffer | Sodium borate (1.8%); boric acid (0.5%). | 2.3 |
| Creamy consistency former | Cetyl alcohol | 5.0 |
| Vehicle | Water | Balance |

The pH of the composition is then brought to any desired alkaline value up to about 11.0 by the addition of sodium hydroxide.

Example No. X

| Agent | Chemical composition | Percentage |
|---|---|---|
| Spermicidal agent | Dodecaoxyethylene glycol monoacylate of an acid of the group consisting of undecylenic, oleic, and erucic acids. | 5.0 |
| Plasticizing agent | Propylene glycol (5.0%); sorbitol (5.0%). | 10.0 |
| Thickening agent | Sodium carboxymethyl cellulose (2.3%); Irish moss (1.0%). | 3.3 |
| Transparentizing agent | Ethyl alcohol | 5.0 |
| Creaming agent | Cetyl alcohol (1.0%); stearic acid (1.0%). | 2.0 |
| Preservative | Butyl p-hydroxybenzoate | .02 |
| Buffer | Sodium acetate (2.0%); acetic acid (1.0%). | 3.0 |
| Vehicle | Water | Balance |

The pH of the composition is then brought to any desired alkaline value up to about 11.0 by the addition of sodium hydroxide.

I may give the product a white appearance, or a creamy consistency by the use of such materials as cetyl alcohol, stearic acid or other cosmetic materials known to the arts for producing water miscible opaque cosmetic creams, as exemplified in part in the above examples. Gums, either natural or synthetic, may be substituted for gum tragacanth in the above examples, such as gums of the Arabin type or of the Bassorin type, for example, or synthetic gums produced by condensation or polymerization, or mixtures thereof with gums having the desired properties, as will be understood by those skilled in the art. Water miscible fatty esters, propylene glycol, polyethylene glycols, polyethylene glucose, sorbitol and other humectants may be used in place of glycerol in substantially the same proportions.

In the foregoing examples, neither the spermicidal agent nor the other agents therein can function alone as a spermicidal composition. The spermicidal agent, as a 5% solution in water, for example, would not provide mechanical barrier action, adhesiveness, or many of the other previously mentioned desiderata. The remaining agents would not provide spermatocidal activity. Only the entre novel combination will prove effective, non-irritant and non-toxic. Other preservatives than butyl p-hydroxybenzoate may be used, and the alcohol may be eliminated without detriment to the product.

For the purpose of demonstrating the effectiveness of my novel spermicidal composition and the shortness of time within which the composition operates, tests were made on the following compounds to determine the spermicidal time thereof. In these tests, the Brown and Gamble technique was used. For convenience, the spermicidal agent is listed alone in the following table, with the spermicidal time, but the remaining agents were similar to those given in "Example No. I" above;

Table No. I

| Novel spermicidal ester composition containing— | Concentration | pH | Spermicidal time | Rabbit eye irritation |
|---|---|---|---|---|
| | Percent | | Min. | |
| Dodecaethyleneglycol monolaurate. | 5 | 7.5 | 5 | Non-irritating. |
| Do | 5 | 8.0 | 4 | Do. |
| Do | 5 | 9.4 | 3 | Do. |
| Do | 5 | 10.1 | 3 | Do. |
| Polyoxyethyleneglycol monolaurate. | 5 | 9.0 | 6 | Do. |
| Hexaoxyethyleneglycol monostearate. | 5 | 8.0 | 18 | Do. |
| Hexaoxyethyleneglycol monooleate. | 7 | 6.0 | 9 | Do. |
| Nonaoxyethyleneglycol monostearate. | 7 | 9.0 | 18 | Do. |

The above table clearly shows that the spermicidal times can be varied by the use of different spermicidal ester concentrations and that with spermicidal concentrations up to 7% in the alkaline range to above 10.0 pH, the spermicidal times are wholly satisfactory, being all within one-half hour, and are non-irritating. In additional biological, clinical and physical tests, it was demonstrated that the spermicidal compositions when used in the alkaline range from about 7.1 to 11.0 possess all the necessary and desirable properties heretofore enumerated and that the spermicidal agents in the alkaline range are unusually stable, and are non-ionic, bland, nonoxidizing, non-coagulating and non-irritating to the mucous membranes.

Although various methods of preparing the spermicidal compositions may be used, the following is preferred:

The spermicidal agent is melted and heated to about 60° C. and is then poured into water at substantially the same temperature. The alcohol and preservative are then separately mixed with the thickener, and the plasticizer may then be added and mixed in the required amount. The entire mixture is then poured into water, while stirring and mixing, and mixing is continued until a homogeneous jelly is obtained.

It will be understood that although the invention has been described in connection with various preferred embodiments, variations and modifications may be resorted to as will be apparent to those skilled in the art without departing from the spirit or scope of the invention as defined in the claims annexed hereto.

Having thus described the invention, what is claimed as new is:

1. An improved spermicidal jelly composition effective within a relatively short period of time without irritating delicate body membranes contacting therewith which comprises a spermicidal agent consisting of a fatty acid monoester of a polyoxyethylene glycol defined by the generic formula $CH_2OR_a(CH_2OCH_2)_xCH_2OR_b$, in which "$x$" is an integer of at least 2, "$R_a$" is hydrogen, and "$R_b$" is the acyl radical of a fatty acid having at least six carbon atoms, a water dispersible thickening agent having adhesive action in the composition, a humectant plasticizing agent and an alkalizing agent rendering the composition alkaline to a pH ranging from approximately 8 to 10, said composition being adapted for use in an aqueous vehicle.

2. An improved spermicidal jelly composition effective within a relatively short period of time without irritating delicate body membranes contacting therewith which comprises a spermicidal agent consisting of a fatty acid ester of a polyoxyethylene glycol, said glycol having the generic formula $CH_2OH(CH_2OCH_2)_xCH_2OH$, in which "$x$" is an integer of at least 2, in combination with a fatty acid having at least six carbon atoms, a water-dispersible thickening agent having adhesive action in the composition, a humectant plasticizing agent therefor, an alkalinizing buffer rendering the composition alkaline to a pH ranging from approximately 8 to 10, and an alcohol to transparentize the composition, said composition being adapted for use in an aqueous vehicle.

3. An improved spermicidal jelly composition effective within a relatively short period of time without irritating delicate body membranes contacting therewith which comprises a spermicidal agent consisting of a fatty acid ester of a polyoxyethylene glycol, said glycol having the generic formula $CH_2OH(CH_2OCH_2)_xCH_2OH$, in which "$x$" is an integer of at least 2, in combination with a fatty acid having at least six carbon atoms, a water-dispersible thickening agent having adhesive action in the composition, a humectant plasticizing agent therefor, and a borate-boric acid buffer rendering the composition alkaline to a pH ranging from approximately 8 to 10, said composition being adapted for use in an aqueous vehicle.

4. An improved spermicidal jelly composition effective within a relatively short period of time without irritating delicate body membranes contacting therewith which comprises a spermicidal agent consisting of a fatty acid ester of a polyoxyethylene glycol, said glycol having the generic formula $CH_2OH(CH_2OCH_2)_xCH_2OH$, in which "$x$" is an integer of at least 2, in combination with a fatty acid having at least six carbon atoms, a water-dispersible thickening agent having adhesive action in the composition, a humectant plasticizing agent therefor, a borate-boric acid buffer providing a pH ranging from approximately 8 to 10, and alcohol to transparentize the composition by eliminating air inclusions, said composition being adapted for use in an aqueous vehicle.

5. An improved spermicidal jelly composition effective within a relatively short period of time without irritating delicate body membranes contacting therewith which comprises a spermicidal agent consisting of a fatty acid ester of a polyoxyethylene glycol, said glycol having the generic formula $CH_2OH(CH_2OCH_2)_xCH_2OH$, in which "$x$" is an integer of at least two, in combination with a fatty acid selected from the group consisting of caproic, heptylic, caprylic, nonylic, capric, lauric, myristic, palmitic, margaric, stearic, undecylenic, oleic and erucic acids, a water-dispersible thickening agent having adhesive action in the composition, a humectant plasticizing agent therefor, an alkalinizing buffer providing a pH in the composition ranging from approximately 8 to 10, and alcohol to transparentize the composition, said composition being adapted for use in an aqueous vehicle.

6. An improved spermicidal jelly composition effective within a relatively short period of time without irritating delicate body membranes contacting therewith which comprises a spermicidal agent consisting of an organic acid ester of a polyoxyethylene glycol, said glycol having the generic formula $CH_2OH(CH_2OCH_2)_xCH_2OH$, in which "$x$" is an integer of at least two, in combination with an organic acid having at least six carbon atoms, a water-dispersible thickening agent having adhesive action in the composition, a humectant plasticizing agent therefor, and a water-soluble buffer for bringing the pH of the resulting composition to a pH ranging from approximately 8 to 10, said composition being adapted for use in an aqueous vehicle.

7. An improved spermicidal jelly composition effective within a relatively short period of time without irritating delicate body membranes contacting therewith which comprises a spermicidal agent consisting of dodecaethylene glycol monolaurate, a water-dispersible thickening agent having adhesive action in the composition, a humectant plasticizing agent therefor, an alkalinizing buffer providing a pH in the composition within the alkaline range ranging from approximately 8 to 10, and a transparentizing agent to transparentize the composition, said composition being adapted for use in an aqueous vehicle.

8. An improved spermicidal jelly composition effective within a relatively short period of time without irritating delicate body membranes contacting therewith which comprises a spermicidal agent consisting of hexaoxyethylene glycol monooleate, a water-dispersible thickening agent having adhesive action in the composition including gum tragacanth, a humectant plasticizing agent therefor, an alkalinizing buffer providing a pH in the composition within the alkaline range ranging from approximately 8 to 10, and a transparentizing agent in the composition, said composition being adapted for use in an aqueous vehicle.

9. An improved spermicidal jelly composition effective within a relatively short period of time without irritating delicate body membranes contacting therewith which comprises a spermicidal agent consisting of nonaoxyethylene glycol monostearate, a water-dispersible thickening agent having adhesive action in the composition, a humectant plasticizing agent therefor consisting at least in part of glycerin and an alkalinizing buffer in the composition providig a pH ranging from approximately 8 to 10 therein.

10. An improved spermicidal jelly composition effective within a relatively short period of time without irritating delicate body membranes contacting therewith which comprises a spermicidal agent consisting of dodecaoxyethylene glycol monolaurate, a water-dispersible thickening agent having adhesive action in the composition including gum tragacanth at least in part, a humectant plasticizing agent consisting at least in part of glycerin, and an alkalinizing buffer of triethanolamine in the composition to provide a pH within the alkaline range ranging from approximately 8 to 10, said composition being adapted for use in an aqueous vehicle.

11. An improved spermicidal jelly composition effective within a relatively short period of time without irritating delicate body membranes contacting therewith which comprises a spermicidal agent consisting of an organic acid ester of polyoxyethylene glycol in combination with an organic acid of the group consisting of caproic, heptylic, caprylic, nonylic, capric, lauric, myristic, palmitic, margaric and stearic acids and the corresponding unsaturated acids, a water-dispersible thickening agent including sodium carboxymethyl cellulose to provide adhesive action in the composition, a humectant plasticizing agent including glycerin and a buffer including sodium hydroxide providing a pH within the alkaline range ranging from approximately 8 to 10, said composition being adapted for use in an aqueous vehicle.

12. An improved spermicidal jelly composition in accordance with claim 6 in which the thickening agent is selected from the group consisting of gum tragacanth, Irish moss, acacia, Karaya gum, sodium carboxymethyl cellulose, hydroxyethyl cellulose and methyl cellulose and in which the humectant plasticizing agent is selected from the group consisting of glycerin, sorbitol, glycerite or boroglycerin, polyethylene glycol, polyethylene glucose, and propylene glycol, and in which the buffer is selected from the group consisting of sodium acetate, and mixtures thereof with acetic acid, borax and mixtures thereof with boric acid, thiethanolamine, sodium hydroxide and potassium hydroxide.

ABRAHAM TAUB.

REFERENCES CITED

The following references are of record in the file of this patent:

UNITED STATES PATENTS

| Number | Name | Date |
|---|---|---|
| 2,467,884 | Elias | Apr. 19, 1949 |